No. 891,393.
PATENTED JUNE 23, 1908.
E. M. BASSLER.
FILTER PRESS.
APPLICATION FILED APR. 30, 1907.
2 SHEETS—SHEET 1.
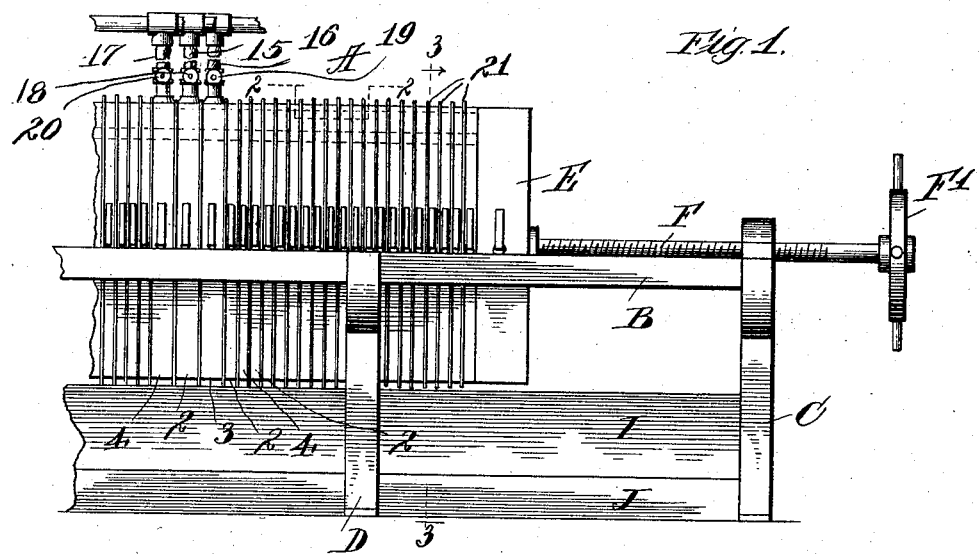
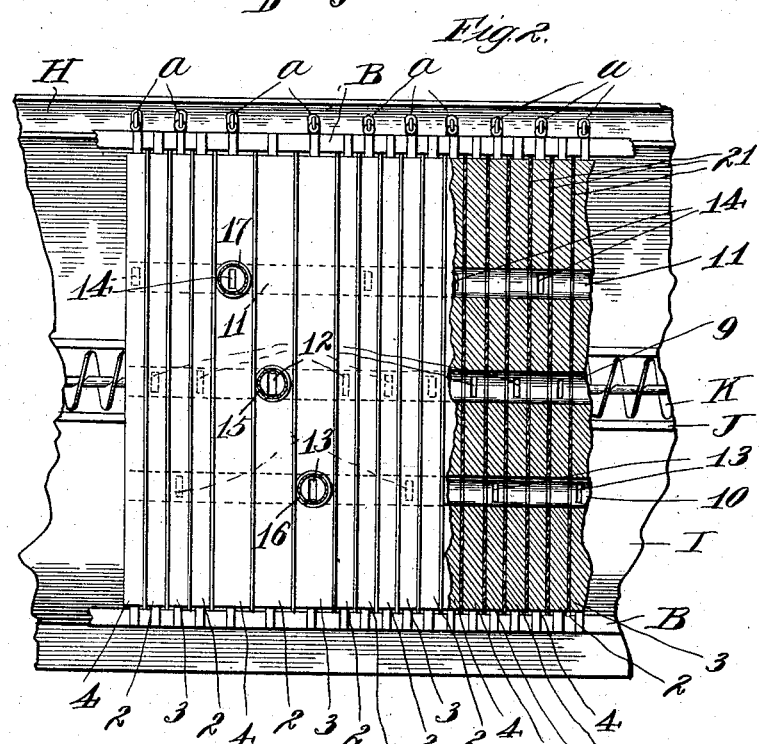
Witnesses:
G. A. Rauberschmidt
E. M. Klatcher
Inventor:
Edwin M. Bassler,
By Chas. E. Waldo,
Atty No. 891,393. PATENTED JUNE 23, 1908.
E. M. BASSLER.
FILTER PRESS.
APPLICATION FILED APR. 30, 1907.
2 SHEETS—SHEET 2.
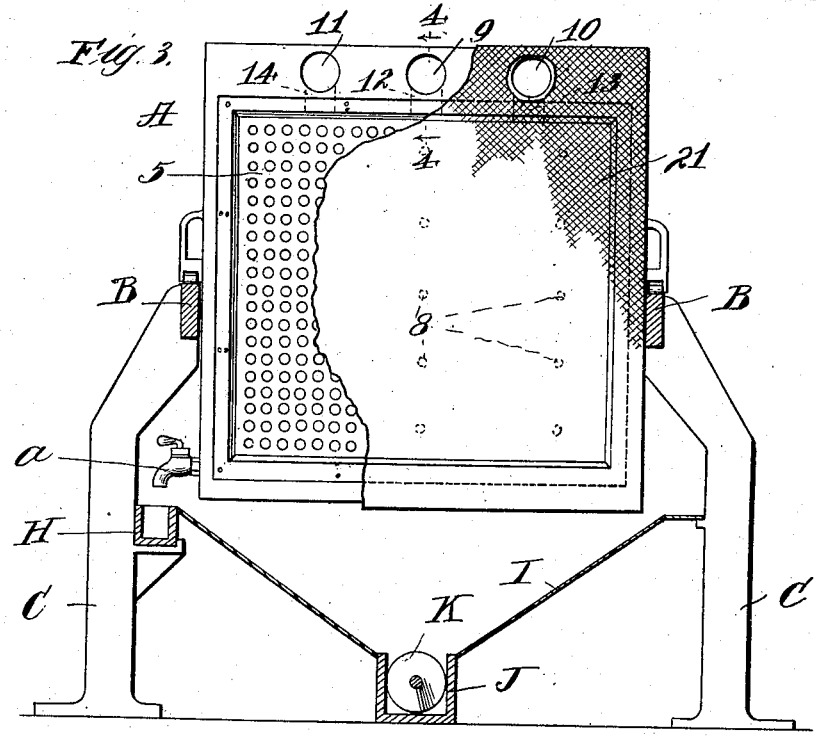
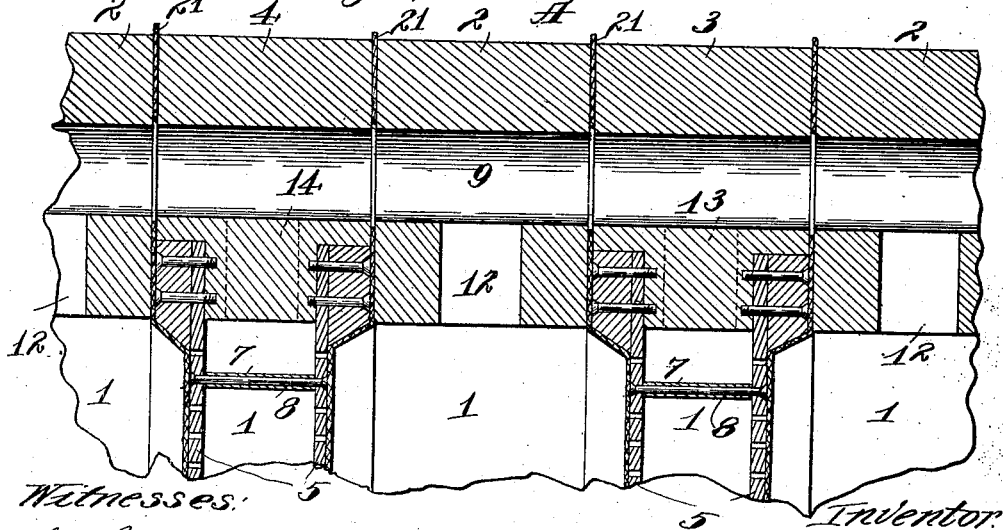
Witnesses:
Inventor.
Edwin M. Bassler,
By Geo. E. Waldo,
Atty.

UNITED STATES PATENT OFFICE.

EDWIN M. BASSLER, OF CHICAGO, ILLINOIS.

FILTER-PRESS.

No. 891,393.   Specification of Letters Patent.   Patented June 23, 1908.

Application filed April 30, 1907. Serial No. 371,048.

*To all whom it may concern:*

Be it known that I, EDWIN M. BASSLER, a citizen of the United States, and a resident of Chicago, in the county of Cook and State of Illinois, have invented certain new and useful Improvements in Filter-Presses, of which the following is a specification.

This invention relates to filter presses.

The object of the invention is to provide a filter press so constructed and arranged that, in addition to its usual function as a filter press for removing surplus water or water of suspension from the material undergoing treatment, the contents of the filter press may be thoroughly dried ready for commercial use. To this end a filter press of my invention consists of the various features, combinations of features and details of construction hereinafter described and claimed.

In the accompanying drawings, in which a filter press embodying my invention is fully illustrated, Figure 1 is a partial side elevation of my improved filter press. Fig. 2 is a partial top plan view thereof on an enlarged scale, a portion of the filter press being shown in section, taken on line 2—2 of Fig. 1. Fig. 3 is a sectional elevation on an enlarged scale, taken substantially on the line 3—3 of Fig. 1; and Fig. 4 is an enlarged sectional view on the line 4—4 of Fig. 3.

Referring now to the drawings, A designates, collectively, the filter plates supported and adapted to slide lengthwise on track bars B mounted in fixed position on a suitable frame comprising transverse end members C and intermediate supporting legs D. The filter plates A are adapted to be forced together so as to form tight joints between adjacent plates by means of heads E mounted to slide on the track bars B and adapted to be forced into strong engagement with the filter plates A by any suitable means, as by thrust screws F threaded through the end frame members C, said thrust screws F being preferably connected to the heads E by means of suitable swivel joints to provide for retracting said heads E to permit the filter plates A to be separated. Hand wheels F' are preferably secured to the outer ends of the thrust screws F to provide for conveniently operating said thrust screws with desired power.

All or a portion of the filter plates A are provided with stop cocks *a* which communicate with the interiors thereof and are adapted for drawing off the water which leaches out of the contents of the filter press and accumulates in said filter plates. As shown, the faucets *a* are adapted to discharge into a trough H mounted in suitable position on the frame of the press.

Beneath the press is a hopper I into which the contents of said filter press is adapted to fall when the plates of said press are opened to discharge the same and formed in the bottom of said hopper is a trough J in which is mounted a screw conveyer K, which may be driven by any suitable means, not shown.

As regards their general features, and excepting as hereinafter particularly described, all of the foregoing elements are old and well known and will be readily understood by persons skilled in the art without a further detailed description thereof.

My invention resides particularly in the construction arrangement and relation of the filter plates A, which I will now describe.

The filter plates A are all of skeleton structure, being provided with holes or openings 1 which extend entirely through the same, the holes 1 of different plates registering with each other when said press is assembled for use and said holes being made as large as consistent with requisite strength in said plates. Said filter plates A also comprise three different sets 2, 3 and 4, each plate 2 being inserted between a plate 3 on one side and a plate 4 on the other. Secured between the openings 1 in said plates are perforated plates 5, said perforated plates being preferably secured to the lateral faces of the filter plates 3 and 4, whereby, in use, the interiors of said filter plates will form separate chambers closed at their sides by said perforated plates 5. Preferably, also, the relation is such that said chambers in the plates 2 will be considerably wider than the chambers in the plates 3 and 4. This can be conveniently effected as shown in Fig. 4, by rabbeting the edges of said plates 3 and 4 around the edges of the openings 1 therein, so as to receive the perforated plates 5, said rabbets being of such depth as will provide chambers of desired width in said plates, respectively. With this construction, it is obvious, that when the plates A are separated, the lateral sides of the chambers 1 in the plates 2 will be unobstructed so that the contents thereof may fall freely into the hopper I.

The perforated plates 5 are made as thin as consistent with requisite strength, say one eighth of an inch in thickness, and to strengthen the same to withstand the pressure to which they will be subjected in use, the plates 5, secured to the opposite sides of each of the plates 3 and 4, are preferably connected by suitable braces, consisting, as shown, of sections of pipe 7 of a length equal to the distance between said plates 5, and rods 8, which pass through said pipe sections, the ends of which are secured in the plates 5, preferably in such manner that the outer ends of said rods will be flush with the outer surfaces of said perforated plates. This may be conveniently effected by counter-sinking the outer ends of the holes through which the rods 8 pass, riveting the ends of said rods and dressing them off flush with the surfaces of said plates.

Formed in the plates A, preferably above the openings or chambers 1 therein, are passageways 9, 10 and 11, which extend continuously from end to end of the entire series of plates and comprise registering sections formed in the different plates.

The passageways 9, 10 and 11 are connected with the chambers or openings in the plates 2, 3 and 4, respectively, by means of suitable ports 12, 13 and 14.

The chambers or openings 1 in the filter plates 2 of my improved press, are adapted to receive the material to be treated, as starch, distillery and brewery slop, gluten, meal, fertilizers, ore slimes and the like, which is delivered thereto mixed with a sufficient quantity of water to flow freely by means of suitable connection with a source of supply, comprising a pipe 15 which communicates with the passageway 9. Said means for supplying material to the press, preferably comprises suitable means, as a pump, not shown, whereby the contents of the chambers 1 in the plates 2 may be subjected to desired pressure in order to expel surplus water or water of suspension.

Air under pressure, and preferably heated to a desired degree to facilitate drying of the contents of the filter press, is adapted to be delivered to the chambers 1 in the filter plates 3 from any suitable source of supply, not shown, through a pipe 16, which communicates with the passageway 10.

The chambers 1 in the filter plates 4 are provided with discharge openings which may be the stop cocks $a$. Preferably, however, the chambers in said filter plates 4 are vacuum chambers, the air being adapted to be exhausted therefrom by means of a suitable exhaust pump, not shown, connected thereto by means of a pipe 17 which communicates with the passageway 11.

To provide for desired movement of the filter plates to open the press to discharge the contents thereof, the pipes 15, 16 and 17 are all flexible and to provide for controlling the delivery of material to the press and the admission of air to and its discharge from the press, the connections to the chambers 1 of the different sets of filter plates are controlled by suitable valves, as shown by valves 18, 19 and 20 in the pipes 15, 16 and 17, respectively. Also, to provide for pipe connections, of desired size, the filter plates to which the pipes 15, 16 and 17 are directly connected, are made of suitable size, being, as shown, somewhat thicker than the other filter plates.

To prevent any of the material being treated from escaping through the perforations in the plates 5 and wasted, said plates are, in use, covered by pieces of filter cloth 21 inserted and clamped between adjacent plates when the press is set up for use, said pieces of filter cloth being provided with openings in line with the passageways 9, 10 and 11, so as not to obstruct said passageways.

As shown, also, only the filter plates 3 and 4 are provided with stop cocks $a$.

The method of operating my improved filter press is as follows:—The press is first set up with the pieces 21 of filter cloth covering the perforated plates or screens 5, said pieces of filter cloth, as heretofore stated, being clamped between adjacent filter plates and the thrust screws F set up until practically tight joints are formed between said filter plates. The valves 19 and 20, which control communication with the chambers 1 of the plates 3 and 4, are closed and the valve 18 which controls the delivery of the material to be treated to the press, is opened. As the material to be treated, which, as previously stated, is mixed with a sufficient quantity of water so that it will flow freely, enters the chambers 1 in the filter plates 2, which, as heretofore stated, are arranged between plates 3 and 4, the surplus water or water of suspension will drain or leach through the perforations in the plates or screens 5 into the chambers in the plates 3 and 4, whence it may escape through the stop cocks $a$ into the trough H, said stop cocks being usually left open while the chambers in the plates 2 are being filled, thus permitting the water to run off from the press freely. By means of the pump or other means which supplies the material to the press, the contents of the chambers in the plates 2 may be subjected to a considerable pressure which will operate to squeeze out a large per centage of the surplus water contained in said material. As soon as the surplus water has been thus expelled to as large an extent as possible or practicable, as will be indicated by the small discharge from the stop cocks $a$, the stop cocks $a$ of the plates 3 are closed and the valve 19 which controls the delivery of air to the press is opened, thus permitting air under pressure to enter the chambers 1 of the plates 3.

The pressure of the air in the chambers of said plates 3 will operate to expel considerable additional water from the material being treated, which will run into the chambers 1 in the plates 4 and escape through the stop cocks a thereof, which are still open. The drying of the contents of the chambers 1 in the plates 2 can obviously be effected by continuing the operation of the press in the condition just described, the air admitted to the chambers in the plates 3, under pressure and preferably heated to a desired degree, being forced through the material contained in the chambers of the plates 2 and passing thence into the chambers in the plates 4, and out through the open stop cocks a. Preferably, however, when the discharge from the stop cocks a of the plates 4 stops, or practically stops, said stop cocks will also be closed and the valve 20 which controls the passageways leading to the chambers in said plates 4, is opened. As soon as said valve 20 is opened, the air will be exhausted from the chambers in said plates 4, which will operate to draw the air from the chambers in the plates 3 through the material contained in the chambers in the plates 2, thus reducing the air pressure which it is necessary to maintain in said plates 3. A further advantage of employing means for exhausting the air from the plates 4 is that in this manner the air may be confined and subjected to treatment whereby disagreeable odors or injurious vapors or gases may be eliminated. This process will be continued until the contents of the press is thoroughly dried. The valves 18, 19 and 20 will then be closed, shutting off the supply of the material to the machine and also the air and the vacuum. The contents of the press is then discharged by separating the filter plates, which will be done in the usual way, and the press re-set up. This cycle will be repeated indefinitely in the operation of the press.

I claim:—

1. A filter press comprising skeleton filter plates and screens between adjacent filter plates whereby the openings in said filter plates will form separate chambers when the press is set up, comprising a chamber adapted to receive and contain the material to be treated, a chamber adapted to be connected with a source of air supply and a chamber provided with a discharge opening, a chamber which receives the material being arranged between an air chamber and a chamber provided with a discharge opening.

2. A filter press comprising skeleton filter plates and screens between adjacent filter plates whereby the openings in said filter plates will form separate chambers when the press is set up, comprising a chamber adapted to receive and contain the material to be treated, a chamber adapted to be connected with a source of air supply and a vacuum chamber, a chamber which receives the material to be treated being arranged between an air chamber and a vacuum chamber.

3. A filter press comprising skeleton filter plates and screens between adjacent filter plates whereby the openings in said filter plates will form separate chambers when the press is set up, comprising a chamber adapted to receive and contain the material to be treated, a chamber adapted to be connected with a source of air supply and a chamber provided with an air discharge opening, a chamber which contains the material being arranged between an air chamber and a chamber provided with a discharge opening, and said screens being secured to said plates in such relation that when separated a side of the chamber in the plate which contains the material will be uncovered.

4. A filter press comprising skeleton filter plates and screens between adjacent filter plates whereby the openings in said filter plates will form separate chambers when the press is set up, comprising a chamber adapted to receive and contain the material to be treated, a chamber adapted to be connected with a source of air supply and a chamber provided with an air discharge opening, a chamber which contains the material being arranged between an air chamber and a chamber provided with a discharge opening, and said screens being secured to the sides of the plates which contain air supply and air discharge chambers adjacent to a chamber which contains the material to be treated.

5. A filter press comprising skeleton filter plates and screens between adjacent filter plates whereby the openings in said filter plates will form separate chambers when the press is set up, comprising a chamber adapted to receive and contain the material to be treated, a chamber adapted to be connected with a source of air supply and a chamber provided with an air discharge opening, a chamber which contains the material being arranged between an air chamber and a chamber provided with a discharge opening, and said screens being secured in rabbets formed in the opposite sides of the plates the openings in which form the air supply and air discharge chambers, said rabbets extending around the edges of said openings.

6. A filter press comprising skeleton filter plates and screens between adjacent filter plates whereby the openings in said filter plates will form separate chambers when the press is set up, comprising a chamber adapted to receive and contain the material to be treated, a chamber adapted to be connected with a source of air supply and a chamber provided with an air discharge opening, a chamber which contains the material being arranged between an air chamber and a chamber provided with a discharge opening, and said screens being secured to opposite sides of the plates the openings in which form the air supply and air discharge chambers and stay braces which connect the screens secured to each plate.

7. A filter press comprising skeleton filter plates and screens between adjacent filter plates whereby the openings in the different filter plates will form separate chambers when the press is set up, comprising chambers adapted to receive and contain the material to be treated, chambers adapted to be connected with a source of air supply and chambers provided with air discharge openings, the chambers which receive the material to be treated being each arranged between an air supply chamber and a chamber provided with a discharge opening, said press being provided with different passageways which extend through all of said filter plates, separate pipe connections thereto and ports which connect said passageways, respectively, with different series of chambers.

In testimony, that I claim the foregoing as my invention, I affix my signature in presence of two subscribing witnesses, this 19th day of April, A. D. 1907.

EDWIN M. BASSLER.

Witnesses:
 CHARLES B. GILLSON,
 K. A. COSTELLO.